(12) United States Patent
Suzuki (10) Patent No.: US 8,681,388 B2
(45) Date of Patent: Mar. 25, 2014

(54) IMAGE FORMING APPARATUS AND PRINTING METHOD ALLOWING THE SWITCHING OF OPERATION MODES INCLUDING POWER SAVING MODE

(75) Inventor: Takaaki Suzuki, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 404 days.

(21) Appl. No.: 13/032,718

(22) Filed: Feb. 23, 2011

(65) Prior Publication Data

US 2011/0216375 A1     Sep. 8, 2011

Related U.S. Application Data

(60) Provisional application No. 61/310,990, filed on Mar. 5, 2010.

(51) Int. Cl.
*G06F 3/12* (2006.01)
*G06K 15/00* (2006.01)
*H04N 1/00* (2006.01)

(52) U.S. Cl.
USPC .......... 358/401; 358/1.1; 358/1.14; 358/1.15; 358/1.16

(58) Field of Classification Search
USPC ........ 358/401, 1.15, 1.16, 1.1, 1.14, 1.9, 501, 358/413, 437, 435, 426.02, 508; 713/323, 713/340, 100, 178, 300, 320, 500, 502, 713/600; 718/104, 102, 103
See application file for complete search history.

(56) References Cited

U.S. PATENT DOCUMENTS

2008/0239380 A1*  10/2008  Takahashi ................... 358/1.15

* cited by examiner

*Primary Examiner* — Ngon Nguyen
(74) *Attorney, Agent, or Firm* — Amin, Turocy & Watson, LLP (57) ABSTRACT

Certain embodiments provide an image forming apparatus including: a memory; a read unit; a scanner processor configured to transfer image data at a first transfer speed; an image processing unit; a print unit; a printer processor to transfer print image data at a second transfer rate; a main processor to cause the printer processor to switch the second transfer speed to another, and cause the scanner processor to switch the first transfer speed to another; and a switching controller to control operation of the print unit in a plurality of operation modes corresponding to the plurality of print speeds, cause the main processor to switch the operation clock, cause the scanner processor and the printer processor respectively to switch each transfer speed to another.

10 Claims, 5 Drawing Sheets

| MODE | PRINT SPEED | POWER CONSUMPTION | MAIN CPU CLOCK | COMMUNICATION CLOCK BETWEEN MAIN CPU AND SCANNER CPU | COMMUNICATION CLOCK BETWEEN MAIN CPU AND PRINTER CPU |
|---|---|---|---|---|---|
| HIGH SPEED | 80CPM | HIGH (800W) | 1GHz | 1Mbps | 1Mbps |
| MEDIUM SPEED | 40CPM | MEDIUM (400W) | 500MHz | 500Kbps | 500Kbps |
| LOW SPEED | 20CPM | LOW (200W) | 250MHz | 250Kbps | 250Kbps |
| POWER SAVING | — | EXTREMELY LOW (10W) | 100MHz | — | — |

IMAGE FORMING APPARATUS AND PRINTING METHOD ALLOWING THE SWITCHING OF OPERATION MODES INCLUDING POWER SAVING MODE

CROSS-REFERENCE TO RELATED APPLICATION

The present application claims priority under 35 U.S.C. 119 to U.S. Provisional Application Ser. No. 61/310,990, to Suzuki, filed on Mar. 5, 2010, the entire disclosure of which is incorporated herein by reference.

FIELD

Embodiments described herein relate generally to an image forming apparatus and a printing method.

BACKGROUND

Up to now, a technique is known in which an image forming apparatus most suitable for electric power saving is selected from a group of a plurality of image forming apparatuses connected on a network.

Each of the image forming apparatuses selectively switches between a normal mode and a power saving output mode. Each image forming apparatus displays a power consumption when the normal mode is selected and a power consumption when the power saving output mode is selected.

Each image forming apparatus communicates power consumption information with other image forming apparatuses. An image forming apparatus operated by a user selects an image forming apparatus most suitable for electric power saving, and displays the selected apparatus for the user.

When the number of times when the normal mode is selected is larger than the number of times when a power saving mode is selected, there arises such a drawback that a power saving advantage is deteriorated.

DETAILED DESCRIPTION

Certain embodiments provide an image forming apparatus including: a memory on a system bus; a read unit configured to read an original document surface to generate image data; a scanner processor configured to operate the read unit and transfer the image data from the read unit to the memory through the system bus at a first transfer speed; an image processing unit configured to convert the image data within the memory into print image data; a print unit configured to print the print image data, and operate at any one of a plurality of printing speeds different in power consumption; a printer processor configured to operate the print unit, and transfer the print image data from the memory to the print unit through the system bus at a second transfer rate; a main processor configured to operate in response to an operation clock, cause the printer processor to switch the second transfer speed to another, and cause the scanner processor to switch the first transfer speed to another; and a switching controller configured to control operation of the print unit in a plurality of operation modes corresponding to the plurality of print speeds, cause the main processor to switch the operation clock in synchronism with timing when a state of the print unit switches to any one of the plurality of operation modes, cause the scanner processor to switch the first transfer speed to another, and cause the printer processor to switch the second transfer speed to another.

Hereinafter, an image forming apparatus and a printing method will be described in detail with reference to the accompanying drawings. In the respective drawings, identical parts are denoted by the same symbols, and the redundant description will be omitted.

The image forming apparatus according to the embodiment is directed to an MFP (multi function peripheral). The printing method according to the embodiment is directed to a method of copying an original document in the MFP.

Figure 1:
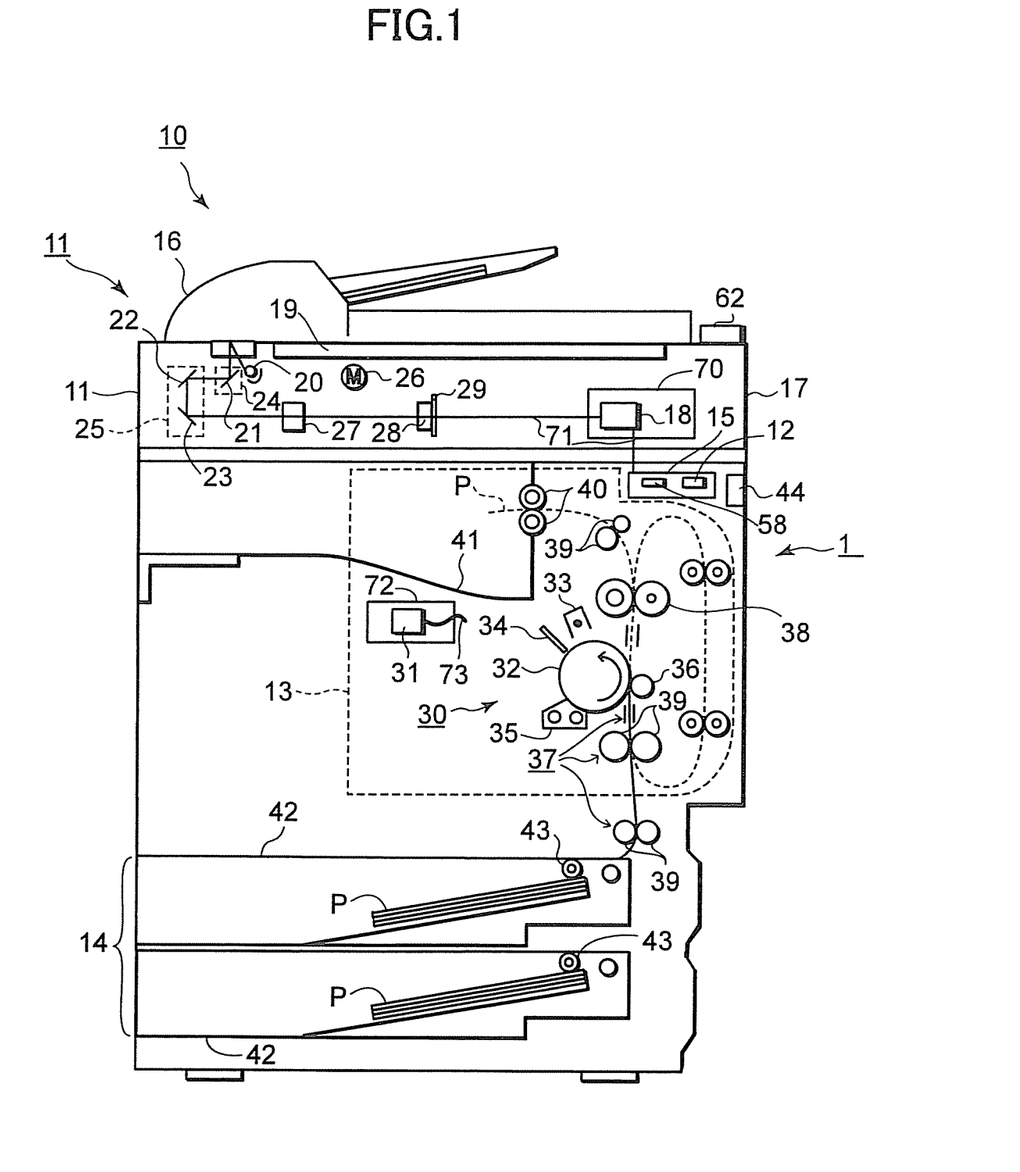
FIG. 1 is a configuration diagram of an image forming apparatus according to an embodiment.

FIG. 1 is a configuration diagram of the MFP. An MFP 10 includes a scanner unit 11, an image processing unit 12, a printer unit 13, a paper feed unit 14, and a system control unit 15.

The scanner unit 11 scans an original document surface, and outputs read image data.

The scanner unit 11 includes a document feeder 16, an image read unit 17 that reads the original document surface by the aid of a reflected light, a scanner CPU 18 (scanner processor) that controls the entire scanner unit 11, and a scanner control board 70 on which the scanner CPU 18 is mounted.

The document feeder 16 transports an original document onto a glass plate 19.

The image read unit 17 includes a light source 20, mirrors 21, 22, 23, a carriage 24 having the mirror 21, a carriage 25 having the mirrors 22 and 23, and a motor 26 that moves the carriages 24 and 25. The image read unit 17 includes a lens 27, a CCD (charge coupled device) sensor 28, and an image generation unit 29.

The lens 27 condenses a reflected light on the CCD sensor 28. The CCD sensor 28 generates electric charge from light energy by photoelectric conversion. The CCD sensor 28 includes a plurality of photodiodes aligned in a main scanning direction, and a buffer.

The photodiodes detect the reflected light from the original document surface on a line in the main scanning direction. The original document moves in a sub-scanning direction. After the CCD sensor 28 is charged with electric charges, the CCD sensor 28 outputs the stored electric charges. The CCD sensor 28 continuously outputs a charge quantity for one line in the sub-scanning direction.

The image generation unit 29 samples the charge quantity for one line at a sampling timing. The image generation unit 29 generates information indicative of 0 and 1 in association with positional information of the original document surface. The information indicative of 0 and 1 at all positions on the original document surface corresponds to image data.

The scanner CPU 18 transfers the image data to a RAM (random access memory) 58 within the system control unit 15 from an internal bus 71.

The RAM 58 includes a storage area used as a page memory, and a storage area for print image data. The scanner CPU 18 writes the read image data into the storage area as the page memory. The internal bus 71 is, for example, a harness.

The scanner CPU 18 communicates with the system control unit 15. In the scanner CPU 18, a transfer speed of the image data is set by the system control unit 15. The transfer speed is directed to a repetition period of the clock signal during transfer or communication.

The scanner control board 70 has a storage element for operating the scanner CPU 18 and various driver LSIs (large scale integration) mounted thereon.

The image processing unit 12 converts the image data within the RAM 58 into the print image data for the print unit 13. The image processing unit 12 expands or corrects the print image data.

The printer unit 13 prints the print image data.

The printer unit 13 includes an image print unit 30 that prints an image on a sheet, a printer CPU 31 (printer processor) that controls the entire printer unit 13, and a printer control board 72 on which the printer CPU 31 is mounted.

The image print unit 30 includes a photosensitive drum 32, a charging unit 33, an exposure unit 34, a developing unit 35, a transfer device 36, a sheet transport mechanism 37, and a fixing unit 38.

The photosensitive drum 32 rotates by a motor under the control of the printer CPU 31. The charging unit 33 charges a surface of the photosensitive drum 32. The exposure unit 34 has a semiconductor laser. The exposure unit 34 modulates a laser beam in response to an image signal.

The exposure unit 34 forms an electrostatic latent image on a surface of the photosensitive drum 32. The developing unit 35 develops the electrostatic latent image on the outer peripheral surface of the photosensitive drum 32 with toner.

The transfer device 36 brings a transfer roller located apart from the photosensitive drum 32 in contact with the photosensitive drum 32. The transfer device 36 transfers a toner image onto the sheet with the help of the transfer roller.

The sheet transport mechanism 37 has plural pairs of rollers 39 and guides upstream of the fixing unit 38 in a sheet transport direction.

Upstream of the fixing unit 38, the sheet transport mechanism 37 pulls up the sheet from the paper feed unit 14, and guides the sheet to the image print unit 30. The image print unit 30 forms the toner image on the sheet. The fixing unit 38 fixes the toner image due to heat and pressure.

The sheet transport mechanism 37 includes plural pairs of rollers 39, guides, and discharge rollers 40 downstream of the fixing unit 38 in the sheet transport direction. The sheet transport mechanism 37 discharges the sheet onto which the image is fixed onto a sheet discharge tray 41. The printer unit 13 may have a sheet transport mechanism 37 with a reverse transport path.

The printer CPU 31 communicates with the system control unit 15 through an internal bus 73 such as a harness.

The printer control board 72 has a storage element for operating the printer CPU 31 and LSIs for various drivers mounted thereon.

The paper feed unit 14 includes a plurality of trays 42. Each tray 42 receives sheets. The tray 42 has a pair of rollers 43 that picks up the sheets.

The system control unit 15 generates a print job upon inputting the original document to the scanner unit 11. The system control unit 15 receives a network print request via a network interface unit 44, and generates the print job.

Figure 2:
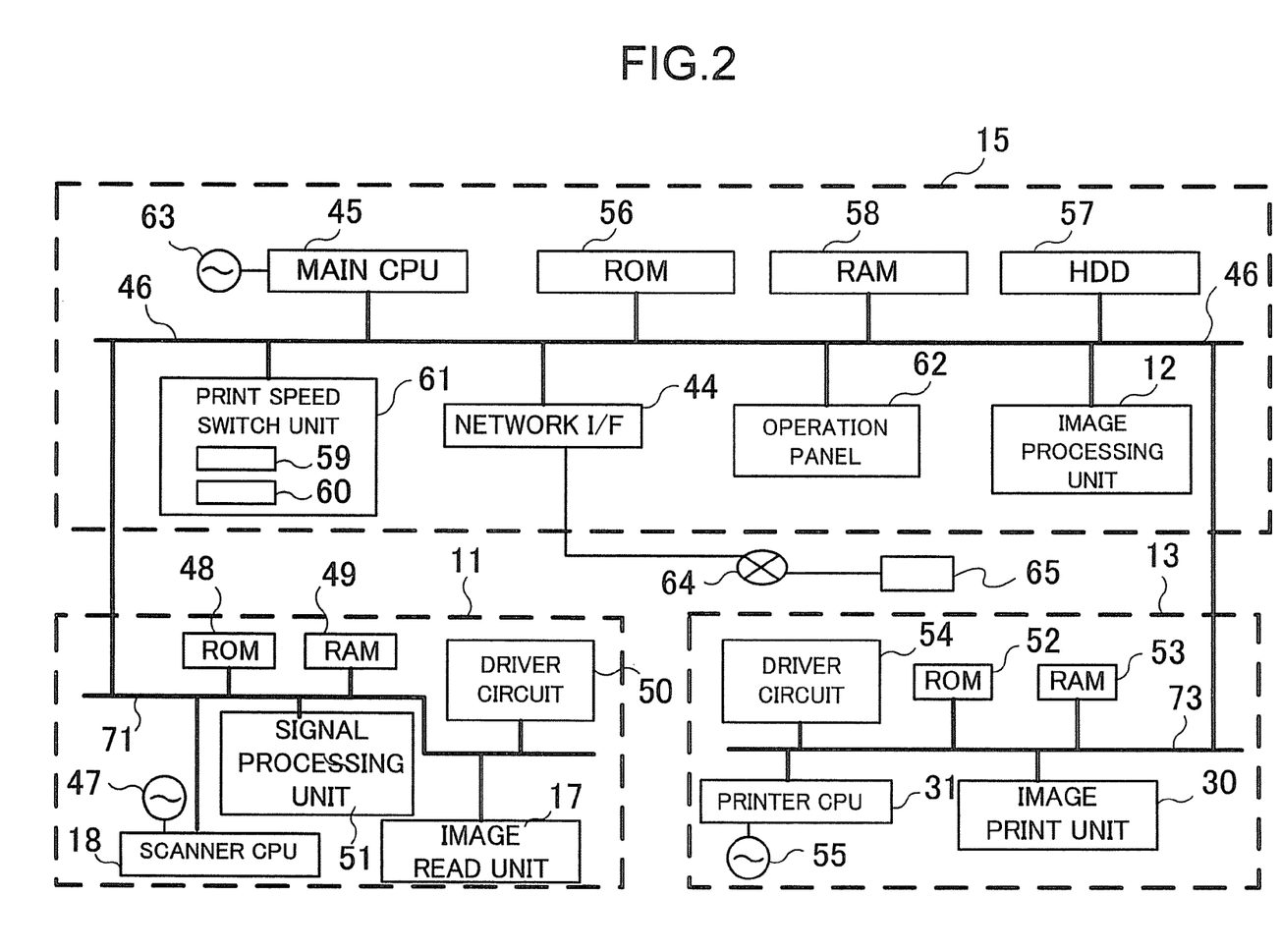
FIG. 2 is a block diagram illustrating a control system that mainly conducts the control of a system control unit used in the image forming apparatus according to the embodiment.

FIG. 2 is a block diagram illustrating a control system that mainly conducts the control of the system control unit 15. The symbols already described above represent the same elements.

A control system of the MFP 10 includes the scanner CPU 18 in the scanner unit 11, the printer CPU 31 in the printer unit 13, a main CPU 45 (main processor) in the system control unit 15, and a system bus 46.

The scanner unit 11 includes the internal bus 71 connected to the system bus 46, a ROM (read only memory) 48 that stores a control program therein, a work RAM 49, various driver circuits 50 (only one shown), and a signal processing unit 51.

The driver circuits 50 control timing of exposure scanning, and drive the CCD sensor 28. The signal processing unit 51 corrects or compresses the image data from the CCD sensor 28.

The operation clock signal of the scanner CPU 18 is obtained by dividing a clock signal generated from an oscillation frequency of a local oscillator 47. The operation clock signal is distributed to the respective components of the local scanner unit 11.

The scanner CPU 18 compresses the image data from the scanner unit 11. The scanner CPU 18 outputs a write address of a page memory area and the image data to the system bus 46.

The scanner CPU 18 transfers the image data to the RAM 58 from the image read unit 17 through the system bus 46 at a first transfer rate. The transfer speed is set according to the mode. The scanner CPU 18 writes the compressed image data into the RAM 58 on a one-page quantity basis.

The printer unit 13 includes an internal bus 73 connected to the system bus 46, a ROM 52 that stores the control program therein, a work RAM 53, and various driver circuits 54 (only one shown).

The driver circuits 54 drive a semiconductor laser and the rotation of a polygonal motor. The driver circuits 54 also drive transport of the sheet, development, and fixing.

The RAM 58 has another memory area in which print image data processed by the image processing unit 12 is stored.

The operation clock signal of the printer CPU 31 is obtained by dividing a clock signal generated from an oscillation frequency of a local oscillator 55. The operation clock signal is distributed to the respective components of the printer unit 13. The printer CPU 31 outputs a read address in another memory area to the system bus 46.

The printer CPU 31 transfers the print image data to the image print unit 30 from the RAM 58 through the system bus 46 at a second transfer rate. The transfer speed is set according to the mode. The printer CPU 31 retrieves the print image data.

The system control unit 15 includes the main CPU 45, a ROM 56, a hard disk drive (HDD) 57, a print speed switch unit 61 (switching control unit), the network interface unit 44, and an operation panel 62.

The main CPU 45 transmits instructions for data transmission start and data transfer to the scanner CPU 18 and the printer CPU 31.

The operation clock signal of the main CPU 45 is obtained by dividing the clock signal generated from oscillation frequency generated by a local oscillator 63. The operation clock signal is distributed to the respective components of the system control unit 15.

The ROM 56 stores the control program for the main CPU 45 therein. The hard disk drive 57 stores a large volume of image data therein.

The print speed switch unit 61 controls the operation of the image print unit 30 in a mode of the operation corresponding to the print speed. The print speed is directed to the number of sheets printed and output per one minute. The print speed switch unit 61 is configured by an LSI and a storage element.

The print speed switch unit 61 includes a mode management unit 59 that holds mode information on a present mode of the image print unit 30, and a control table 60.

Figure 3:
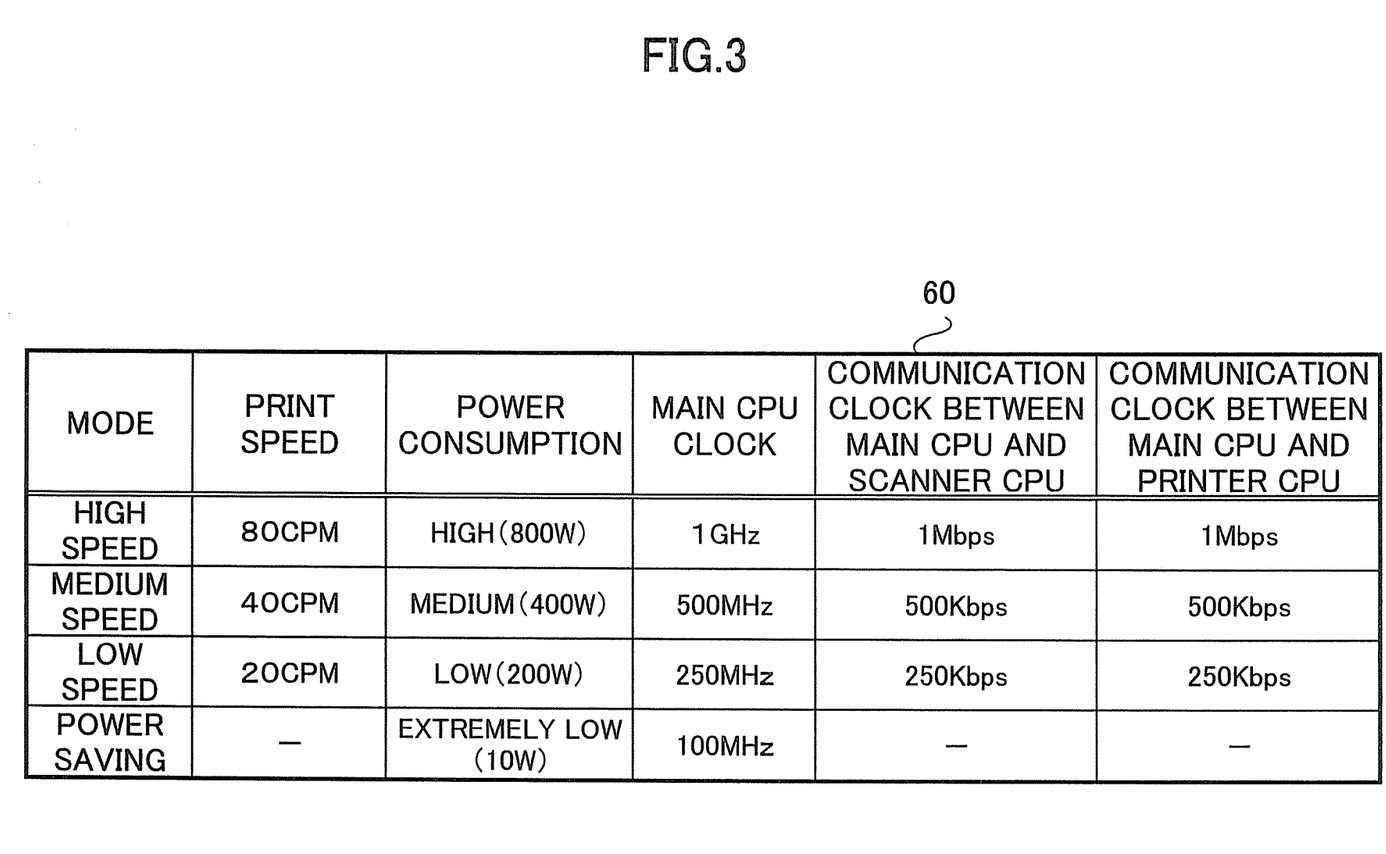
FIG. 3 is a diagram showing an example of a control table used in the image forming apparatus according to the embodiment.

FIG. 3 is a diagram illustrating an example of the control table. The control table 60 is a main table. The control table 60 associates four kinds of modes with a print speed, a power consumption, an operation clock, and two transfer speeds.

The network interface unit 44 (FIG. 2) is configured by, for example, a LAN (local area network) interface.

Upon receiving a network print request from a personal computer 65 through a LAN 64, the network interface unit 44 analyzes a draw command included in the print job.

The draw command is directed to information for designating characters, a graphic pattern or graphics.

The network interface unit 44 writes the image data obtained by analysis into the RAM 58 as print image data.

The operation panel 62 accepts a user's input such as a mode switch instruction. The operation panel 62 notifies the main CPU 45 of input information. The operation panel 62 has a panel that displays information from the main CPU 45.

Also, in the printing method according to this embodiment, a state of the image print unit 30 is allocated to, for example, a low speed mode; print is conducted by the image print unit 30 at the operation clock of the main CPU 45, the transfer speed of the scanner CPU 18, and the transfer speed of the printer CPU 31, each having the print speed corresponding to the low speed mode; the state of the image print unit 30 is switched to a medium speed mode or a high speed mode by operating the operation panel 62 by the user; and print is conducted by the image print unit 30 at the operation clock and the respective transfer speeds each having the print speed corresponding to the medium speed mode or the high speed mode.

Referring to FIG. 2, the main CPU 45 controls the entire system, and communicates with the scanner CPU 18 and the printer CPU 31 to control a flow of image data.

The transfer control of the image data will be described.

In the scanner unit 11, the image read unit 17 transmits the image data to the system control unit 15 under the control of the scanner CPU 18.

In the system control unit 15, the image processing unit 12 executes compression and expansion of the image data under the control of the main CPU 45. The system control unit 15 transmits the image data to the printer unit 13.

In the printer unit 13, the image print unit 30 prints the image data under the control of the printer CPU 31.

Also, when the system control unit 15 receives a network print request from a user's personal computer 65, the network interface unit 44 analyzes an input print job. The printer unit 13 processes the print job as with the image data from the scanner unit 11.

The changeover of the print speed will be described.

The print speed switch unit 61 switches the mode to another with an input to the operation panel 62, to thereby switch the print speed to another. The user conducts various operations through the operation panel 62. The main CPU 45 issues an instruction to switch the print speed to another to the print speed switch unit 61.

First, the print speed switch unit 61 sets a changeover corresponding to the mode designated by the operation panel 62 based on the control table 60.

For example, the high speed mode is designated. The main CPU 45 notifies the printer CPU 31 that the print speed is 80 CPM (copy per minute). The main CPU 45 sets the operation clock of the main CPU 45 per se to 1 GHz.

The main CPU 45 notifies the scanner CPU 18 that the transfer speed between the main CPU 45 and the scanner CPU is 1 Mbps (mega bit per second). The main CPU 45 notifies the printer CPU 31 that the transfer speed between the main CPU 45 and the printer CPU 31 is 1 Mbps.

After switching the mode to another, the print speed switch unit 61 then switches the print speed to another over the entire printer unit 13. The print speed switch unit 61 notifies the printer CPU 31 of the changeover directly or through the main CPU 45.

The fixing unit 38, the photosensitive drum 32, and the sheet transport mechanism 37 included in the printer unit 13 change the respective operating speeds. The print speed switch unit 61 controls the transport speed of the sheet in a sheet transport route to the designated print speed.

A control in the power saving mode will be described.

The main CPU 45 controls the power supply of the scanner unit 11 and the printer unit 13 to turn off in the power saving mode.

The main CPU 45 stops a communication between the main CPU 45 and the scanner CPU 18. The main CPU 45 stops a communication between the main CPU 45 and the printer CPU 31. The main CPU 45 controls the clock speed of the operation clock of the main CPU 45 to be lowest.

The main CPU 45 conducts control so that the print speed is lower and the power consumption is smaller.

The main CPU 45 controls a time during which operation is made in the low speed mode among three kinds of operation modes to be longer than any times during which operation is made in the other two kinds of operation modes.

The operation of the MFP 10 configured as described above will be described with reference to FIGS. 4 and 5.

Figure 4:
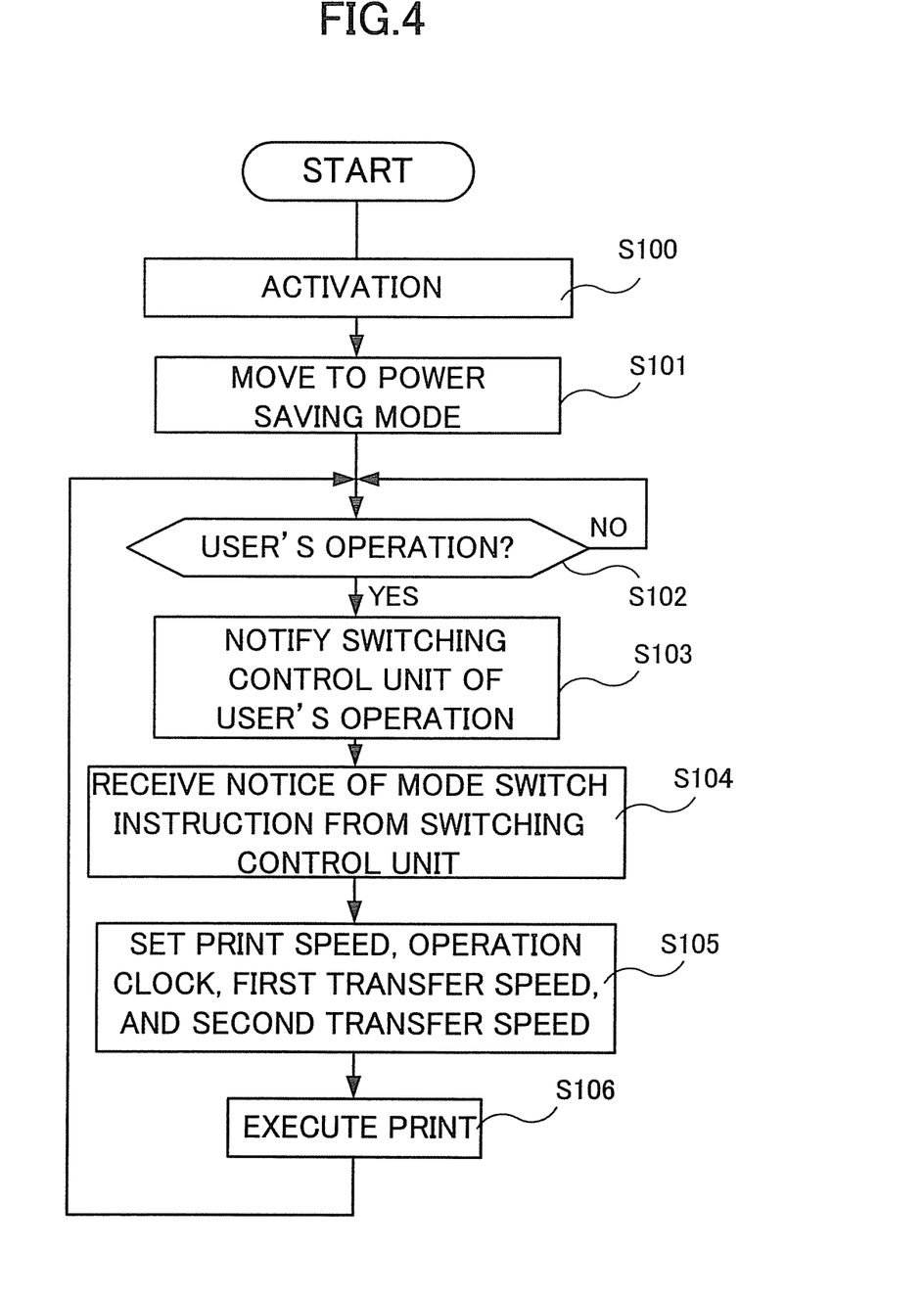
FIG. 4 is a flowchart for describing switching control conducted by a main processor.

FIG. 4 is a flowchart for describing switching control conducted by the main processor 45.

A power supply turns on. Start is made in Act 100. A time elapses. In Act 101, the main CPU 45 transitions a state of the image print unit 30 to the power saving mode.

This is because a rate of the power consumption of the image print unit 30 to the entire MFP 10 is highest due to the power consumption of the fixing unit 38.

In Act 102, the main CPU 45 determines whether the user operates the operation panel 62, or not.

During a period when no input to the operation panel 62 occurs, the main CPU 45 goes through a NO route, and waits in the power saving mode.

When the main CPU 45 receives an interrupt from the operation panel 62, the main CPU 45 goes through a YES route, and notifies the print speed switch unit 61 that the operation is made by the user in Act 103. The main CPU 45 allows the print speed switch unit 61 to determine whether mode switching operation is executed, or not.

In Act 104, the print speed switch unit 61 determines the execution of the mode switching operation. In Act 104, the main CPU 45 is notified of an instruction for switching the mode from the print speed switch unit 61. The print speed switch unit 61 transitions the state of the image print unit 30 to the low speed mode.

In Act 105, the print speed switch unit 61 allows the main CPU 45 to transmit an instruction for switching a communication clock to another to the scanner CPU 18 and the printer CPU 31. The printer CPU 31 switches the print speed and the transfer speed to others. The scanner CPU 18 switches the transfer speed to another. The print speed switch unit 61 switches the operation clock to another.

In Act 106, the main CPU 45 executes printing upon inputting an original document to the scanner unit 11 or receiving network print request. The main CPU 45 returns to processing in Act 102.

The image print unit 30 that is in the low speed mode waits for the user's input or the network print request.

An example of the switching control when the state of the image print unit 30 immediately before processing is advanced to Act 102 is in the medium speed mode and the high speed mode is substantially identical with that of the low speed mode.

Figure 5:
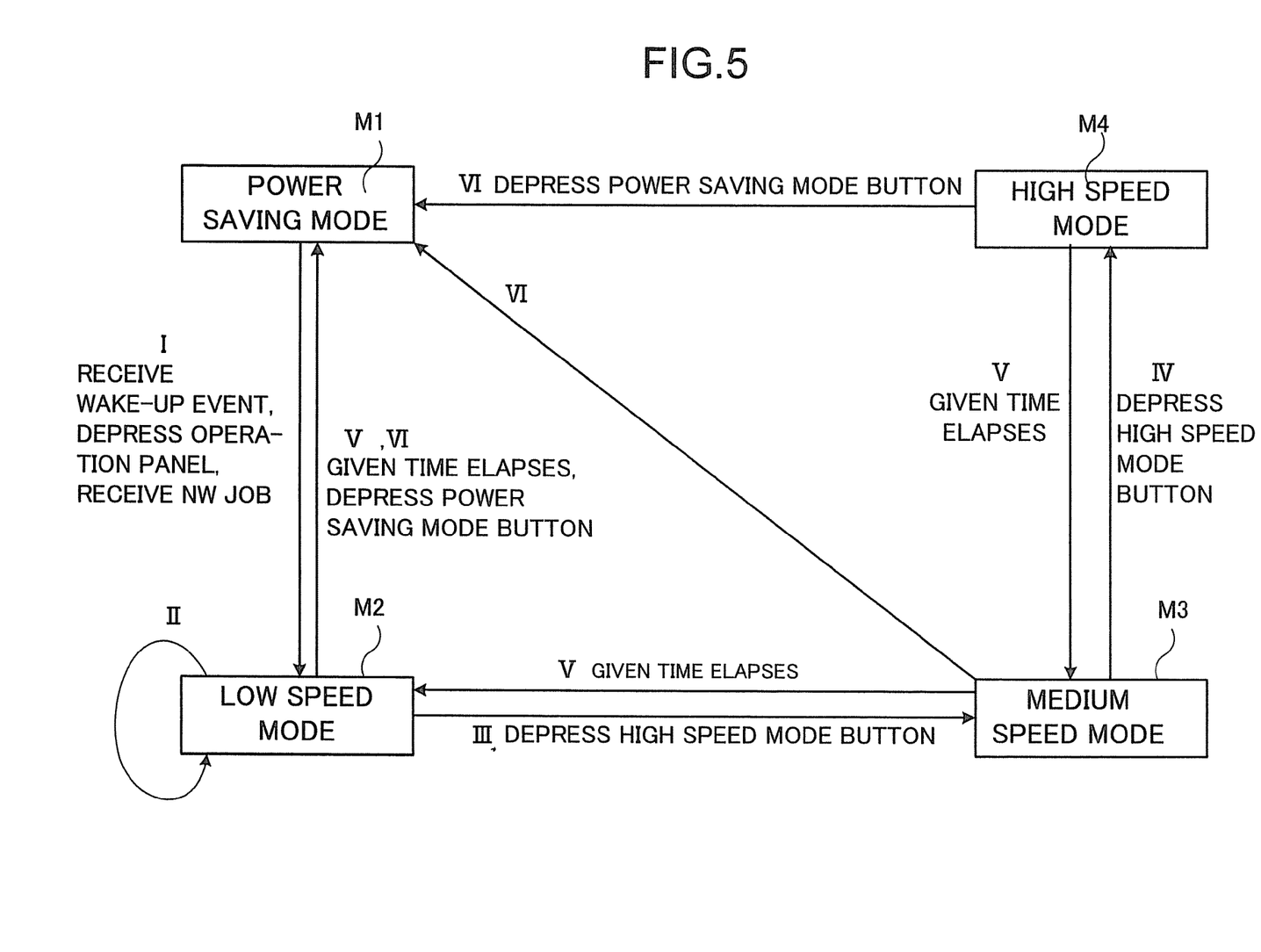
FIG. 5 is a state transition diagram of a switching control unit used in the image forming apparatus according to the embodiment.

FIG. 5 is a state transition diagram of the print speed switch unit 61. When the MFP 10 that is in a power saving mode M1 receives a wake-up event from the user, the print speed switch unit 61 goes through a route added with I, and transitions to a low speed mode M2.

The wake-up event is directed to events that the network interface unit 44 receives a print job that goes through a network (NW), and that a button of the operation panel 62 is depressed.

After returning from interrupting, when the main CPU 45 receives the network print job, the print speed switch unit 61 maintains the mode as it is. The same is applied to a case in which the main CPU 45 receives a notice that the user desires the print job in the low speed mode.

The main CPU 45 views the mode information on the print speed switch unit 61. The main CPU 45 starts printing still in the low speed mode (refer to a route added with II).

When the user depresses a high speed mode button on the operation panel 62 in the low speed mode M2, the main CPU 45 notifies the print speed switch unit 61 of this fact. The print speed switch unit 61 goes through a route added with III, and transitions to a medium speed mode M3.

When printing is conducted in the medium speed mode M3, the main CPU 45 views the mode information on the print speed switch unit 61, and starts the print job in the medium speed mode M3.

When the user depresses a high speed mode button on the operation panel 62 in the medium speed mode M3, the main CPU 45 notifies the print speed switch unit 61 of this fact. The print speed switch unit 61 goes through a route added with IV, and transitions to a high speed mode M4 that is highest in the print speed. The main CPU 45 starts the print job in the high speed mode M4.

Also, after processing transitions to the low speed mode M2, the medium speed mode M3, and the high speed mode M4 to complete the print job, no operation on the operation panel 62 continues for a given time.

After the time elapses, the print speed switch unit 61 transitions the respective modes stepwise from high speed to medium speed, from medium speed to low speed, and from low speed to power saving. As indicated by a route added with V, the print speed switch unit 61 sequentially transitions to the modes smaller in the power consumption. Finally, the print speed switch unit 61 transitions the mode to the state of the power saving mode M1.

A manager sets time values until the movement starts in the ROM 56 or the mode management unit 59 in advance.

Likewise, in any state of the high speed mode M4, the medium speed mode M3, and the low speed mode M2, when the user depresses a power saving mode button on the operation panel 62, the print speed switch unit 61 goes through a route added with VI, and transitions the mode to the power saving mode M1. The print speed switch unit 61 conducts control so as to transitions the mode to the power saving mode through one operation.

With the above configuration, the print speed can change over. An image forming apparatus that transits the state between plural different operation modes is provided. In the image forming apparatus, the power consumption can be suppressed without degrading the convenience of the user.

Naturally, power consumption required when the number of copies is smaller is smaller than that required when the number of copies is larger. A power consumption required for copy of one sheet is still smaller.

However, the user tends to instruct the higher speed mode because of higher print speed. In the related art, the fixing unit requires higher temperature in the higher speed mode. The image forming apparatus according to the related art consumes wasted electric power only for one sheet.

The MFP 10 according to the embodiment transitions from the power saving mode to the low speed mode once, and thereafter transitions from the low speed mode to the higher speed mode. The MFP 10 operates in the low speed mode, and completes one copy. Accordingly, the MFP 10 suppresses the power consumption for a job of copy smaller in the number of sheets.

In copying 100 sheets, the user operates the MFP 10 for the purpose of making the copy speed higher. The MFP 10 completes copy of 100 sheets. The MFP 10 transitions the mode to the power saving mode as illustrated in FIG. 5. The MFP 10 suppresses the power consumption.

It is assumed that the user frequently selects the high speed mode. The state of the MFP 10 returns to the power saving mode with time. Wasted power consumption is suppressed.

Further, the print speed switch unit 61 switches the operation clock and the two transfer speeds to others at the same time to prevent the operation of the MFP 10 from being unstable.

The print speed switch unit 61 checks the main CPU 45, the scanner CPU 18, and the printer CPU 31, individually, immediately before switching. The print speed switch unit 61 confirms that each processor is not excessively burdened with a process or a task.

As a result of check, when any processor is excessively burdened, the print speed switch unit 61 waits for switching.

Also, after switching is executed, the main CPU 45, the scanner CPU 18, and the printer CPU 31 notify components that are supplied with the clock from those processors of a switching message. Switching operation is surely conducted.

When the main CPU 45 notifies the image print unit 30 of the low speed mode, 200 W is ordered for the fixing unit 38. A fixing temperature may be lowered. Because of 20 CPM, the driver circuits 54 makes the rotating speeds of the photosensitive drum 32 and the developing unit 35 slow. The power consumption may be reduced.

In the above embodiment, FIG. 3 shows an example of the control table 60. The MFP 10 determines the operation clock and the two transfer speeds in advance so that the respective print speeds become 80, 40, or 20 CPM. Each value is determined through experiment, simulation, or test.

Also, three kinds of operation modes such as high speed, medium speed, and low speed except for the power saving mode are shown in FIG. 3. However, the number of modes may be 2. The number of modes may be 4, 5 or more. A plurality of modes may be prepared.

In the above embodiment, the network interface unit 44 is configured by an LAN, but the network interface unit 44 may be configured by an interface that transfers data by a serial communication scheme.

Upon receiving serial image data, the network interface unit 44 determines whether the resolution of the serial image data is proper, or not. When the network interface unit 44 determines that the resolution of the serial image data is improper, the network interface unit 44 converts the resolution into print image data of a proper resolution with the help of a program stored in the ROM 56.

In the above embodiment, the names and classifications of the operating modes can be variously changed. The edges of the image forming apparatus and the printing method are not lost by a product that is merely implemented by using other modes that are substantially the same as the low speed mode and so on, and different in the mode names.

The image forming apparatus according to the embodiment may be a color copying machine or a color printer.

While certain embodiments have been described, these embodiments have been presented by way of example only, and are not intended to limit the scope of the inventions. Indeed, the novel methods and systems described herein may be embodied in a variety of other forms; furthermore various omissions and substitutions and changes in the form of methods and systems described herein may be made without departing from the spirit of the inventions. The accompanying claims and their equivalents are intended to cover such forms or modifications as would fall within the scope and spirits of the inventions.

What is claimed is:

1. An image forming apparatus comprising:
a memory configured to save image data;
a print unit configured to print image data in any one of plural operation modes different in power consumption;
a printer processor configured to transfer the image data from the memory to the print unit at any one of plural transfer speeds corresponding to respective operation modes; and
a controller configured to transition, by time elapse, an operation state of the print unit to a power saving mode with a first amount of power consumption lower than a second amount of power consumption in a normal mode, the controller causing the printer processor to switch the transfer speed to lower in the power saving mode.

2. The apparatus of claim 1, wherein
the controller transitions the operation state of the print unit to any one of a high speed mode that is highest in a print speed, a low speed mode that is lowest in the print speed, a medium speed mode that is intermediate between the highest and lowest print speeds, and the power saving mode in which the print unit operates with the first power consumption lower than the second power consumption of the print unit in the low speed mode.

3. The apparatus of claim 2, wherein
the controller wakes up the print unit after the state transitions from the power saving mode to the low speed mode, while the operation state is in the power saving mode.

4. The apparatus of claim 2, further comprising:
a network interface unit connected to a system bus, the system bus being connected to the memory, and a network, configured to receive a print job including a drawing command through the network, and write the drawing command into the memory,
wherein the controller causes the print unit to operate in the low speed mode, upon receiving a network print request by the network interface unit while the operation state is in the power saving mode.

5. The apparatus of claim 2, further comprising:
an operation panel configured to receive a mode switching instruction, wherein
the controller transitions the operation state from the low speed mode to the medium speed mode, or transitions the operation state from the medium mode to the high speed mode, according to instruction input to the operation panel for switching the operation state to the mode having the higher print speed.

6. The apparatus of claim 2, further comprising:
an operation panel configured to receive a mode switching instruction;
a read unit configured to read an original document surface to generate the image data; and
a network interface unit connected to a system bus, the system bus being connected to the memory, and a network, configured to receive a print job including a drawing command through the network, and write the drawing command into the memory, wherein
the controller causes the print unit to operate in the low speed mode, according to an input from any one of the operation panel, the network interface unit, and the read unit, while the operation state is in the power saving mode.

7. The apparatus of claim 6, wherein
the controller transitions the operation state from the low speed mode to one of the medium speed mode and the high speed mode, according to depressing a high speed mode button on the operation panel.

8. The apparatus of claim 2, further comprising:
an operation panel configured to receive a mode switching instruction;
a read unit configured to read an original document surface to generate the image data; and
a network interface unit connected to a system bus, the system bus being connected to the memory, and a network, configured to receive a print job including a drawing command through the network, and write the drawing command into the memory, wherein
the controller gradually transitions the operation state from the high speed mode to the medium speed mode, from the medium speed mode to the low speed mode, or from the low speed mode to the power saving mode, without instruction input for a time from any one of the operation panel, the network interface unit, and the read unit while the operation state is in any one of the high speed mode, the medium speed mode, and the low speed mode.

9. The apparatus of claim 2, further comprising:
an operation panel configured to receive a mode switching instruction, wherein
controller transitions the operation state that is in any of the high speed mode, the medium speed mode, and the low speed mode to the power saving mode, according to instruction input to the operation panel for switching the operation state to the mode in which the print unit operates with the first power consumption while the operation state is in any one of the high speed mode, the medium speed mode, and the low speed mode.

10. The apparatus of claim 1, further comprising:
a system bus connected to the memory;
a read unit configured to read an original document surface to generate the image data;
a scanner processor configured to operate the read unit, the scanner transferring the image data from the read unit to the memory through the system bus at a first transfer speed;
an image processing unit configured to convert the image data within the memory into print image data; and
a main processor configured to cause the printer processor and the scanner processor to order switching of a second transfer speed and the first transfer speed, respectively; wherein the controller controls operation of the print unit in plural operation modes corresponding to plural print speeds, cause the main processor to switch an operation clock substantially in the same timing when a state of the print unit switches to any one of the plurality of operation modes, cause the scanner processor to switch the first transfer speed to another, and cause the printer processor to switch the second transfer speed to another.

* * * * *

UNITED STATES PATENT AND TRADEMARK OFFICE
CERTIFICATE OF CORRECTION

PATENT NO. : 8,681,388 B2
APPLICATION NO. : 13/032718
DATED : March 25, 2014
INVENTOR(S) : Suzuki It is certified that error appears in the above-identified patent and that said Letters Patent is hereby corrected as shown below:

On the title page, item [73]:

Delete "Toshiba Tec Kabushiki Kaisha, Tokyo (JP)"

and insert:

--[73] Assignees:

Kabushiki Kaisha Toshiba, Tokyo (JP)
Toshiba Tec Kabushiki Kaisha, Tokyo (JP)--

Signed and Sealed this
Second Day of December, 2014

Michelle K. Lee
*Deputy Director of the United States Patent and Trademark Office*